US007918912B2

(12) United States Patent
Tomlin et al.

(10) Patent No.: US 7,918,912 B2
(45) Date of Patent: Apr. 5, 2011

(54) ENGINE HYDROCARBON ADSORBER

(75) Inventors: Jacqueline Tomlin, Redford, MI (US); Roger Khami, Troy, MI (US); David S. Moyer, Sterling Heights, MI (US); Hovie Jarrett Cassell, Birmingham, MI (US); William A. Rohrer, III, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 366 days.

(21) Appl. No.: 12/121,320

(22) Filed: May 15, 2008

(65) Prior Publication Data

US 2009/0282793 A1 Nov. 19, 2009

(51) Int. Cl.
*B01D 59/50* (2006.01)

(52) U.S. Cl. ........... 55/385.3; 95/146; 96/108; 123/518; 123/519; 123/520

(58) Field of Classification Search .................... 95/146; 96/108; 55/385.3; 123/518, 519, 520
See application file for complete search history.

(56) References Cited

U.S. PATENT DOCUMENTS 3,221,724 A * 12/1965 Wentworth .................. 123/519
3,665,906 A 5/1972 De Palma
3,727,597 A * 4/1973 Hensler ......................... 123/519
3,826,237 A * 7/1974 Csicsery et al. ......... 123/179.17
4,831,685 A 5/1989 Bosyji et al.
5,154,735 A 10/1992 Dinsmore et al.
5,797,973 A * 8/1998 Dudrey et al. .................. 55/372
5,934,069 A * 8/1999 Hertl et al. ...................... 60/274
5,962,820 A 10/1999 LePoutre
6,230,693 B1 * 5/2001 Meiller et al. ................ 123/519
6,692,551 B2 2/2004 Wernholm et al.
6,736,871 B1 5/2004 Green et al.
6,758,885 B2 * 7/2004 Leffel et al. ..................... 96/134
6,817,345 B2 11/2004 Lawrence
6,886,538 B2 5/2005 Lee et al.
6,905,536 B2 * 6/2005 Wright ............................ 96/134
7,276,098 B2 * 10/2007 Koslow ........................ 55/385.3
2002/0011050 A1 1/2002 Hansen et al.
2003/0192512 A1 * 10/2003 Luley et al. .................. 123/519
2004/0099253 A1 5/2004 Tschantz
2004/0112219 A1 * 6/2004 Leffel et al. ..................... 96/108
2006/0150811 A1 * 7/2006 Callahan et al. ................ 95/146
(Continued)

FOREIGN PATENT DOCUMENTS

JP 56148661 11/1980

OTHER PUBLICATIONS

Tschantz et al., "Activated Carbon and the Control of Evaporative Emissions in Air Induction System", Sep. 29, 2003, MeadWestvaco Corp.—Carbon Dept.—Covington, VA, 25 pages total.

(Continued)

*Primary Examiner* — Robert J Hill, Jr.
*Assistant Examiner* — Chistopher P Jones
(74) *Attorney, Agent, or Firm* — Julia Voutyras; Alleman Hall McCoy Russell & Tuttle LLP

(57) ABSTRACT

Devices, systems and methods are provided for adsorbing hydrocarbons from the air intake system of an internal combustion engine. The devices, systems and methods include a hydrocarbon absorbent material, and a structural element configured to hold the hydrocarbon absorbent material within a clean air tube of an internal combustion engine.

16 Claims, 6 Drawing Sheets

U.S. PATENT DOCUMENTS

| | | | | |
|---|---|---|---|---|
| 2006/0162704 | A1 | 7/2006 | Hagler et al. | |
| 2006/0185651 | A1 | 8/2006 | Hagler | |
| 2006/0225712 | A1* | 10/2006 | Arruda et al. | 123/518 |
| 2006/0257708 | A1* | 11/2006 | Keefer et al. | 429/34 |
| 2006/0266220 | A1* | 11/2006 | Weber et al. | 96/134 |
| 2008/0000455 | A1* | 1/2008 | Treier et al. | 123/519 |

OTHER PUBLICATIONS

"Air Induction System Evaporative Emission Control Technologies", Nov. 2002, MeadWestvaco Corporation Specialty Chemicals Division—Carbon Department Covington, VA, 40 pages total.

* cited by examiner

ENGINE HYDROCARBON ADSORBER

BACKGROUND AND SUMMARY

Hydrocarbon vapor emissions from an engine air intake system of a vehicle may be captured in adsorbing systems.

Example devices adsorb these hydrocarbons when the engine is shut off. The hydrocarbons are desorbed and burned in the engine when the engine is operating. Hydrocarbon loading and purging cycles may continue throughout the useful life of the vehicle. Some devices impose flow restrictions in the air intake to provide sufficient adsorption, while others do not. Some systems utilize various extra valves and/or ducts to open/close and/or expose adsorbing elements only under selected conditions.

However the inventors herein have recognized a number of issues with such approaches. For example, some systems may unacceptably increase air flow restrictions in order to provide sufficient hydrocarbon adsorption. Further still, operators may tamper with flow restricting components by removing the adsorber components without the removal being obvious. As yet another example, there may be issues related to degradation of mechanical actuation to close and/or open air intake system components, possibly resulting in unintentional increased airflow restrictions, or both.

Thus in one approach, a hydrocarbon adsorbing arrangement for an internal combustion engine is provided. The hydrocarbon adsorbing arrangement may include an air intake tube having a cross-sectional shape and configured within the engine. An internal structural element may be positioned within the air intake tube and may be configured to support the cross-sectional shape. A hydrocarbon adsorber may be disposed adjacent the internal structural element wherein a fluid containing hydrocarbons passing through the air intake tube can make contact with the hydrocarbon adsorber. This approach provides various options for placing the adsorber within the intake package, resulting in superior purging because the adsorber can be directly adjacent to the engine air flow, and reduces impact on flow restriction (horsepower loss).

In one particular aspect, the internal structural element may retain carbon coated paper within the air intake tube, yet expose the carbon coated paper via cut-outs, or windows in the internal structure. In this way, the structural element, which may be a plastic insert, can not only maintain the cross section of a flexible clean air tube open during high air flow and high heat operating conditions, but also function to collect hydrocarbons during at least engine-off conditions.

It should be appreciated that the internal structural element may be in various forms. As noted, it may be a plastic insert. Also, the structural element may retain the hydrocarbon adsorber between itself and the inner wall of the air intake tube. Alternatively, the adsorber may be adhered to the inner wall of the structural element. Finally, the structural element may include various internal and external cages or shells, where the cages and/or shells retain the adsorber, and where the structural element is inserted and retained within the clean air tube It should also be appreciated that with such an approach the flow of air to the engine combustion chamber may depend on the presence of the hydrocarbon adsorber, so that if the hydrocarbon adsorber is disturbed or removed by a customer, engine performance may be affected by deformation of the elastic tube.

DETAILED DESCRIPTION

Figure 1:
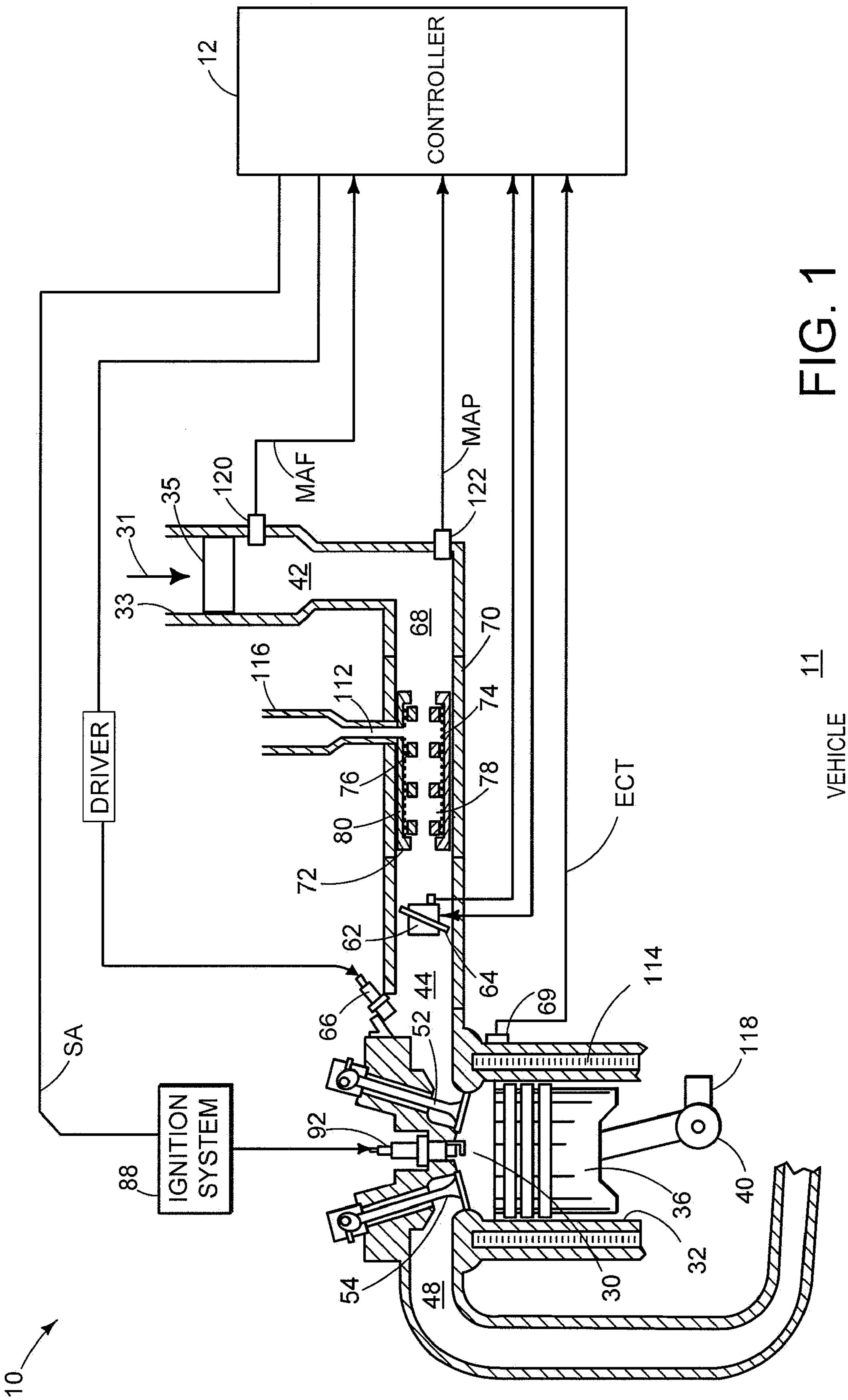
FIG. 1 shows a schematic representation of a vehicle illustrating example engine.

FIG. 1 is a schematic diagram showing one cylinder of multi-cylinder engine 10, which may be included in a propulsion system of a vehicle 11, or other commercial device. Engine 10 may be controlled at least partially by a control system including controller 12, and/or by input from a vehicle operator via an input device such as an accelerator pedal. Combustion chamber (i.e. cylinder) 30 of engine 10 may include combustion chamber walls 32 with piston 36 positioned therein. Piston 36 may be coupled to crankshaft 40.

Combustion chamber 30 may receive intake air 31 from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54.

Intake air 31 may enter the intake manifold 44 via an inner passage 68 of an intake air duct such as a clean air tube 70. The clean air tube 70 may be downstream of, and in fluid communication with, atmospheric air via inlet 33. An air cleaner 35 may be located upstream from the clean air tube 70 through which atmospheric air may flow before entering the clean air tube 70. The clean air tube 70 may be downstream of a throttle 62, or upstream of the throttle 62 as illustrated here in FIG. 1.

A hydrocarbon adsorbing arrangement 72 may be disposed in the clean air tube 70 to adsorb hydrocarbons that may escape from the combustion chamber 30 or intake manifold 44 when the engine 10 is not in operation. The hydrocarbon adsorbing arrangement 72 may include a hydrocarbon adsorbent material 74. The hydrocarbon adsorbent material 74 may be any suitable material configured to adsorb hydrocarbons, for example, a carbon coated sheet. The carbon in the carbon coated sheet may be, for example, activated charcoal, or zeolite etc. The hydrocarbon adsorbing arrangement 72 may include an inner cage 76 configured to hold the hydrocarbon adsorbent material 74 within the clean air tube 70 of the internal combustion engine 10. The inner cage 76 may be configured to expose at least a portion of the hydrocarbon adsorbent material 74 to the inner passage 68 of the clean air tube 70. For example the inner cage 76 may include holes 78 to expose the hydrocarbon adsorbent material 74. In another embodiment, the inner cage 76 may include a rib-cage structure, configured to expose portions of the hydrocarbon adsorbent material 74 between the ribs. In this way, during engine off periods, hydrocarbons that may evaporate from the combustion chamber 30 via the intake valve 52, and the intake manifold 44, may contact and be adsorbed by the hydrocarbon adsorbent material 74, and may thus be prevented from escaping into the atmosphere. When the engine is in operation the air may then pass through the clean air tube 70, and the hydrocarbons may then be desorbed from the hydrocarbon adsorbent material 74 to be burned in the combustion chamber 30.

The inner cage 76 may be configured to fit within an outer shell 80. The hydrocarbon adsorbent material 74 may be disposed between the inner cage 76, and the outer shell 80.

In some embodiments the clean air tube 70 may be made from a resilient material such as rubber, and the like, which may enable more relaxed dimensional tolerances which may be advantageous when assembling and/or reassembling parts of the engine. While this example uses a rubber tube, various other rubber-like materials may be used, such as synthetic rubber or other rubber substitutes, for example. Flexibility may also be advantageous for noise reduction, and compliance to engine roll, during engine 10 operation, as well as for enabling the engine 10 to flex on its mounts to accommodate a range of engine output torques. The engine 10 may, for example, flex and or twists differing amounts depending on engine torque output.

The clean air tube 70 may experience a pressure differential between the inside, and the outside, of the clean air tube 70. For example, clean air tube 70 may experience vacuum pressures within the inner passage 68 generated by the downward stroke of the piston 36 within the combustion chamber 30, and due to upstream flow resistance. The upstream flow resistance may be for example, the air cleaner 35.

When the clean air tube 70 is made from a resilient material then it may be deformable when subject to the differential and/or vacuum pressures. In some embodiments the inner cage 76, or the outer shell 80, or a combination of the inner cage 76, and the outer shell 80 may be configured as an anti-vacuum collapse device, and may be able to support the clean air tube 70 against collapse when exposed to vacuum pressures, while at the same time providing the hydrocarbon adsorbing operation noted herein. Thus, in some embodiments the hydrocarbon adsorbing characteristics of the hydrocarbon adsorbing arrangement 72 may be made integral with, or may function as, or may be, an anti-vacuum collapse device.

The inner cage 76 may be configured to provide sufficient strength against a vacuum induced collapse of the clean air tube 70 while still holding the hydrocarbon adsorbent material 74 securely within the clean air tube 70. The inner cage 76 may include holes 78, or may, for example, include ribs with spaces therebetween. The holes 78, and/or the spaces between the ribs may expose portions of the hydrocarbon adsorbent material 74 to enable sufficient communication between the clean air tube 70 hydrocarbons, and the hydrocarbon adsorbent material 74, to ensure sufficient absorption and desorption.

Further, in some examples, the system may provide tamper-evident features. If the hydrocarbon adsorbing arrangement 72 were to be removed, the clean air tube 70 may deform, or otherwise collapse under certain conditions. The collapsed, or deformed, clean air tube may then cause the vehicle 11 engine 10 to perform poorly, or not all, and provide an indication that the hydrocarbon adsorbing arrangement 72 has been tampered with.

A hole 112 (to be discussed further later) may be configured to provide fluid communication between the inner passage 68 of the clean air tube 70 and another engine component such as a Positive Crankcase Ventilation valve (PCV) 116 which may be coupled to, for example, a crankcase of the engine 10.

Continuing with FIG. 1, various embodiments may use what is known as port injection. In such a configuration fuel injector 66 may be arranged in intake passage 44 to provide fuel into the intake port upstream of combustion chamber 30.

As noted above, intake passage 42 may include the throttle 62 having a throttle plate 64. Throttle 62 may be operated to vary the intake air provided to combustion chamber 30 among other engine cylinders. Intake passage 42 may further include a mass air flow sensor 120 and/or a manifold air pressure sensor 122 for providing respective signals MAF and MAP to controller 12.

Though spark ignition components are shown, in some embodiments, combustion chamber 30 or one or more other combustion chambers of engine 10 may be operated in a compression ignition mode, with or without an ignition spark.

Controller 12 is shown in FIG. 1 may be a microcomputer, and may receive various signals from sensors coupled to engine 10, in addition to those signals previously discussed, including measurement of inducted mass air flow (MAF) from mass air flow sensor 120; engine coolant temperature (ECT) from temperature sensor 69 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122.

As described above, FIG. 1 shows only one cylinder of a multi-cylinder engine, and that each cylinder may similarly include its own set of intake/exhaust valves, fuel injector, spark plug, etc.

Figure 2:
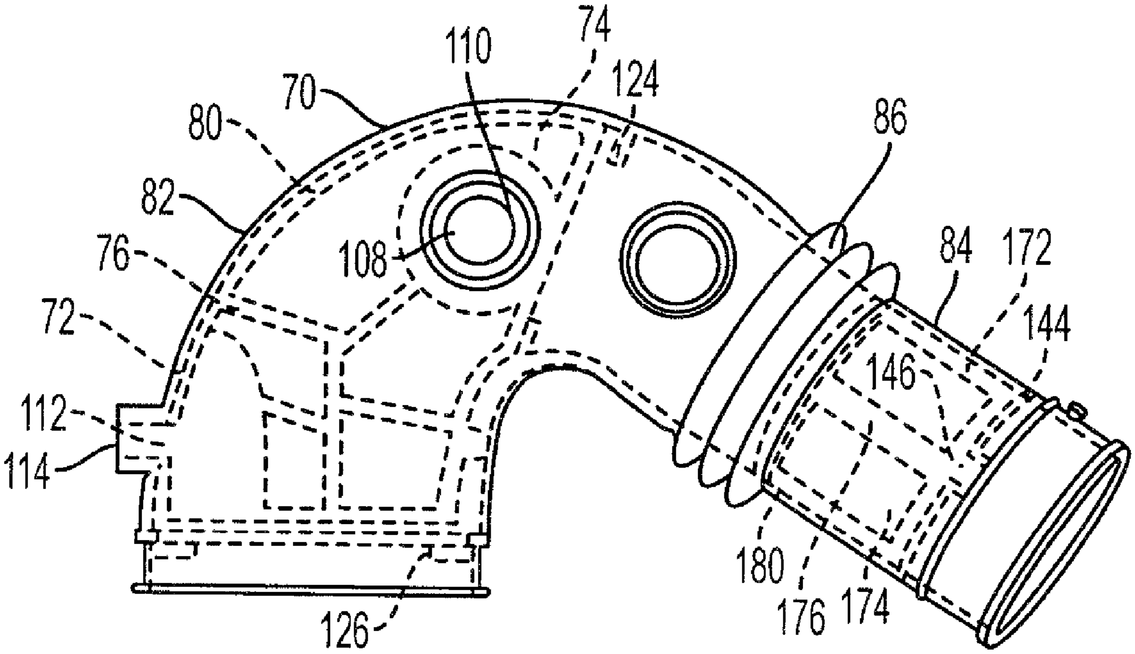
FIG. 2 shows a top view of a clean air tube with two hydrocarbon adsorbing arrangements indicated installed therein in dashed lines.

FIG. 2 is a top view illustrating a clean air tube 70 that may be configured to have a first portion 82, and a second portion 84 coupled to first portion 82 via a pliable element 86. The pliable element 86 may enable the first portion 82 to be more easily repositioned relative to the second portion 84. For example, the pliable portion 86 may be an accordion contoured wall, or the like. The first portion 82 and the second portion 84 may be made integral with one another in a molding operation. The first portion 82 may have a different cross-sectional, and/or a different longitudinal shape than the second portion 84 may have. For example, the first portion 82 may curve along its longitudinal length and may, for example, have a somewhat oval, or elliptical, cross-sectional shape. The second portion 84 may be substantially cylindrical, having a substantially constant cross-section along its longitudinal length. The flow of inlet air may be first through the second portion and then through the first portion, although in other embodiments it may be first through the first portion.

The clean air tube 70 may include more than one hydrocarbon adsorbing arrangements 72. For example, a first hydrocarbon adsorbing arrangement 72 may be disposed in the first portion 82 of the clean air tube 70, and a second hydrocarbon adsorbing arrangement 172 may be disposed in the second portion 82 of the clean air tube 70. Each hydrocarbon adsorbing arrangement 72, 172 may include a respective first and second hydrocarbon adsorbent material 74, 174 supported within the clean air tube 70 by respective first and second inner cages 76, 176. Each inner cage 76, 176 may be configured to fit within a respective first and second outer shell 80, 180. A first and second hydrocarbon adsorbent material 74, 174 may be disposed between each respective inner cage 76, 176, and outer shell 80, 180. In some embodiments, each respective hydrocarbon adsorbing material 74, 174 may be held within the clean air tube 70 with either just an inner cage 76, 176 without an outer shell 80, 180, or alternatively with just an outer shell 80, 180, without an inner cage 76, 176. The respective inner cages 76, 176, outer shells 80, 180 and hydrocarbon absorbent materials 74, 174, e.g., the respective hydrocarbon adsorbing arrangements 72 and 172, may be shaped to fit within each of the respective first portion 82 and second portion 84.

Figure 4A:
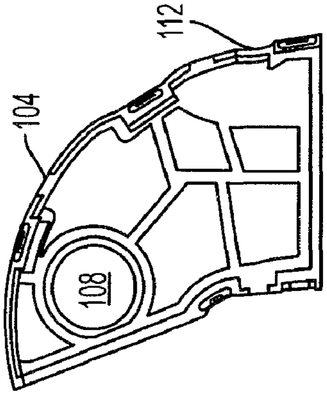
FIGS. 4A and 4B show top views of respective lower and upper subassemblies of the hydrocarbon adsorbing arrangement shown in FIG. 3.
Figure 3:
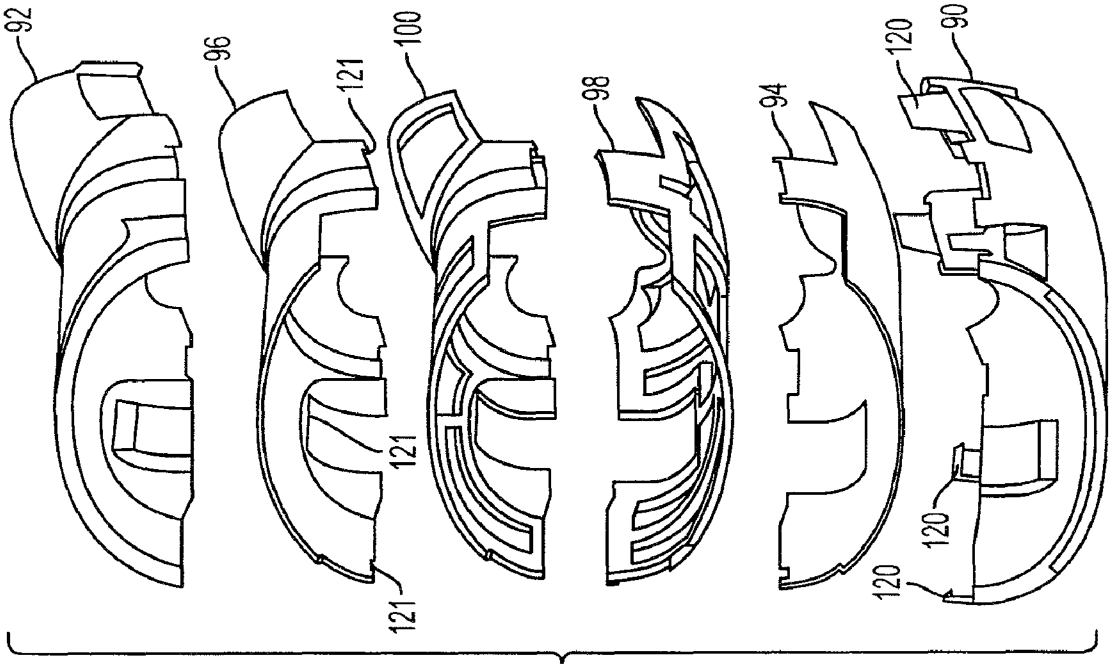
FIG. 3 shows an exploded assembly view of an example hydrocarbon adsorbing arrangement.

FIG. 3 is an exploded view of the first hydrocarbon adsorbing arrangement 72. The first hydrocarbon adsorbing arrangement 72 may include a lower outer shell 90 having a first shape. A lower hydrocarbon adsorbing material 94 may have a substantially similar first shape, and may be positioned in the lower outer shell 90 in a nesting fashion. A lower inner cage 98 may also have a substantially similar first shape, and may be positioned in a similar nesting fashion forming a lower subassembly 106 as shown in FIG. 4A. The lower inner cage 98 and lower outer shell 90 may include mating snaps 120, 121 to facilitate their coupling. Alternatively they may be welded or adhered together, or simply nested and held in place when joined with a corresponding upper subassembly 106 discussed below and shown in FIG. 4B.

Figure 4B:
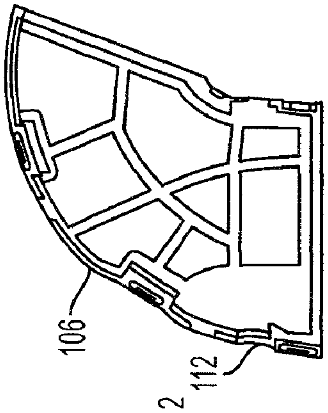

Similarly, the first hydrocarbon adsorbing arrangement 72 may also include an upper outer shell 92 having a second shape. An upper hydrocarbon adsorbing material 96 may have a substantially similar second shape, and may be positioned in the upper outer shell 92 in a nesting fashion. An upper inner cage 100 may also have a substantially similar second shape, and may be positioned in a similar nesting fashion forming an upper subassembly 106 as shown in FIG. 4B. The lower outer shell 90 and upper outer shell 92 may include mating snaps 120, 121 to facilitate their coupling. Alternatively they may be welded or adhered together, or as discussed above they may be simply nested and held in place when joined with the corresponding lower subassembly 104 shown in FIG. 4A.

Accordingly, in the case of the first hydrocarbon adsorbing arrangement 72, the outer shell 80 may comprise two parts, the lower outer shell 90 and the upper outer shell. Similarly, the inner cage 76 may comprise two parts, the lower inner cage 98 and the upper inner cage 100. Also similarly, the hydrocarbon adsorbing material 74 may comprise two parts, the lower hydrocarbon adsorbing material 94 and the upper hydrocarbon adsorbing material 96.In the case of the inner cages being securely coupled to the respective outer shells 90, 92 first, or in the case of the upper and lower assemblies 106, 104 being securely coupled, the hydrocarbon adsorbing material may be held securely in place. In addition, the effective area of the hydrocarbon adsorbing materials 94, 96 may be maximized by cutting the hydrocarbon adsorbing materials 94, 96 to form fit within the outer shells 90, 92. Providing separately formed upper and lower subassemblies 106, 104 it may enable each subassembly to maximize hydrocarbon absorption while still form fitting into an air intake tube into which it is installed. This may include, but may not be limited to, efficient following of tube contours, and forming tube portions to include holes to align with holes in the clean air tube 70. In addition, by shaping each hydrocarbon adsorbing arrangements 72, 172 to fit a particular portion of the clean air tube a total effective area of the hydrocarbon adsorbing material 74 within the tube may be maximized.

Referring now to FIG. 2 a first retention lip 124 may be disposed at within the clean air tube 70 as an inner guide and retention mechanism to position the first hydrocarbon adsorbing arrangement 72. A second retention lip 126 may be disposed within the clean air tube 70 as an outer guide and retention mechanism to position the first hydrocarbon adsorbing arrangement 72. The retention lips 124,126 may be made integrally with the rubber clean air tube 70 and it may be required to push the first hydrocarbon adsorbing arrangement 72 passed the resilient lip for installation of the first hydrocarbon adsorbing arrangement 72. Alternatively the rubber air intake tube 70 may be under tension and formed substantially around edges of the inner cage to resist removal of the inner cage 76, and, or the outer shell 80 from within the rubber air intake tube 70.

Referring now to FIGS. 2, 4A, and 4B, the first hydrocarbon adsorbing arrangement 72 may include a first hole 108 that may be disposed to align with a first hole 110 in the clean air tube 70, and a second hole 112 that may be disposed to align with a second hole 114 in the clean air tube 70. The first hole 108 may be configured to provide fluid communication between the inner passage 68 of the clean air tube 70 and another engine component such as a resonator. The second hole 112 may be configured to provide fluid communication between the inner passage 68 of the clean air tube 70 and another engine component such as a Positive Crankcase Ventilation valve (PCV) 116 (FIG. 1) which may be coupled to a crankcase of the engine 10.

Figure 5:
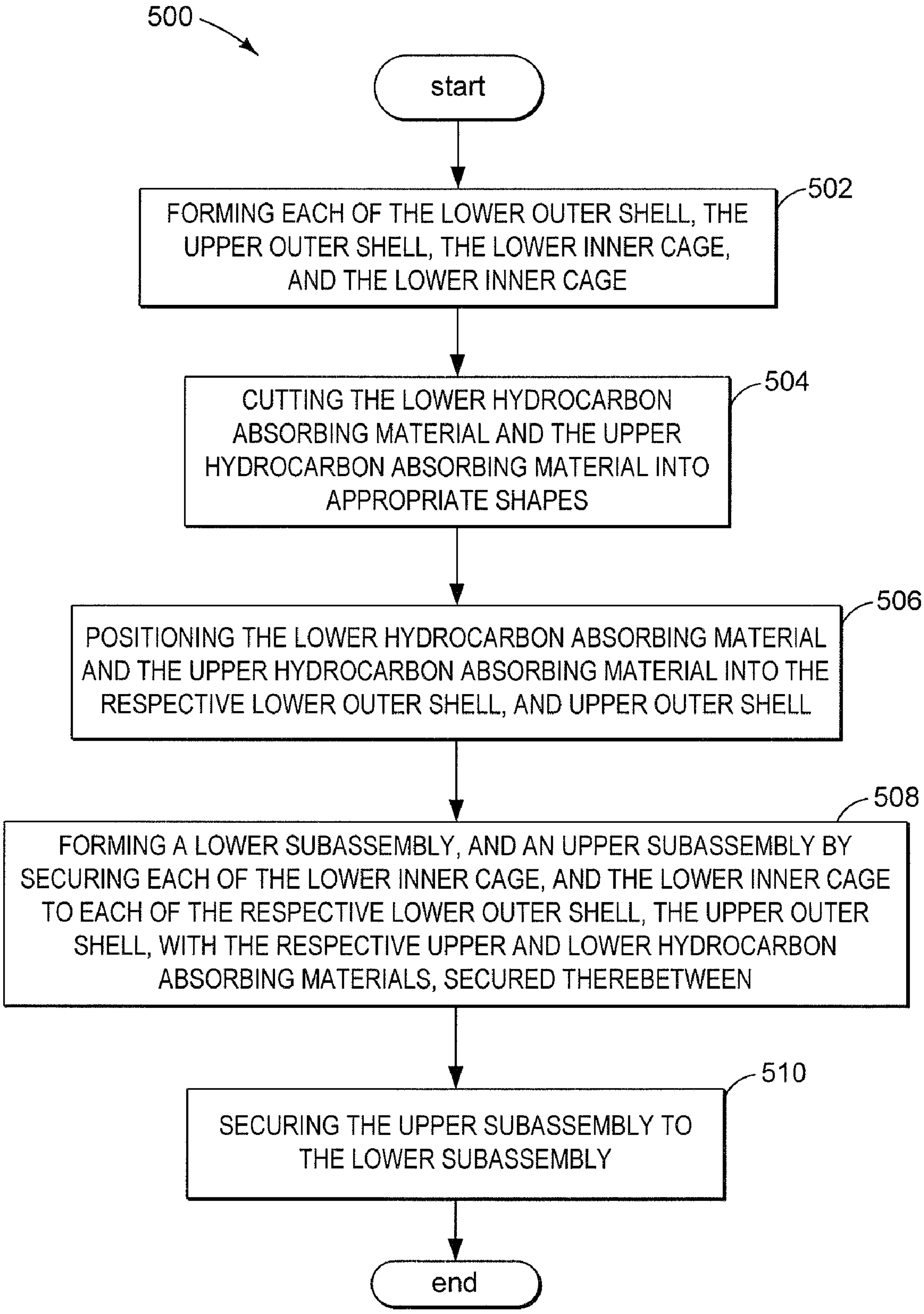
FIG. 5 shows a flow chart illustrating an example manufacturing method.

FIG. 5 is a flow chart illustrating a method 500 for constructing a hydrocarbon adsorbing arrangement for an internal combustion engine in accordance with one embodiment. The method 500 may include, at 502, forming each of the lower outer shell 90, the upper outer shell 92, the lower inner cage 98, and the upper inner cage 100 by, for example injection molding each element. As illustrated at 504, the method 500 may include cutting the lower hydrocarbon adsorbing material 94 and the upper hydrocarbon adsorbing material 96 into appropriate shapes by, for example, die cutting. Then, at 506, the method may include positioning the lower hydrocarbon adsorbing material 94 and the upper hydrocarbon adsorbing material 96 into the respective lower outer shell 90, and upper outer shell 92. The upper and lower hydrocarbon adsorbing materials 94, 96 may be cut from a material that may include an adhesive backing covered by a removable film. After being cut into shape the removable film may be removed from the hydrocarbon adsorbing material 94 to expose the adhesive backing so that the upper and lower hydrocarbon adsorbing materials 94, 96 can be adhered to each of the respective lower outer shell 90, and upper outer shell 92. In some embodiments the method 500 may include, at 508, forming a lower subassembly, and an upper subassembly 106 by securing each of the lower inner cage 98, and the lower inner cage 100 to each of the respective lower outer shell 90, the upper outer shell 92, with the respective upper and lower hydrocarbon adsorbing materials 94, 96 secured therebetween. The forming of the respective lower and upper subassemblies 104, 106 may include heat stacking outer shells 90, 92 to the respective inner cages 98,100 to capture the respective hydrocarbon adsorbing materials 94, 96 therebetween. Other methods of attachment may be used, for example, mechanical fasteners including but not limited to Tinnerman type clips or screws, adhesives, welding, or snaps. Then the method 500 may include, at 510, securing the upper subassembly 104 to the lower subassembly 106. The lower and upper subassemblies 104, 106 may include mating features such as snaps. The securing at 510, may include snapping the upper subassembly 106, to the lower subassembly 104. The securing at 510, may alternatively, or additionally include welding the upper subassembly 106, to the lower subassembly 104.

In some embodiments the lower inner cage 98 may be first secured to the upper inner cage 100. Then the assembled cage may be positioned between the lower outer shell 90 and the upper outer shell 92 with the upper and lower hydrocarbon adsorbing materials 94, 96 adhered in place as described above.

The method 500 may provide ease of assembly and manufacturing flexibility in that it may be possible to mix and match various subassemblies in a modular way to comply with various air intake tube contours and hole placements within a wide ranging product line of engines. The method 500 may also provide a greater level of tamper resistance at least in that the hydrocarbon adsorbing arrangement 72 may be difficult to disassemble and if disassembled it may be difficult to remove the hydrocarbon adsorbing material 74.

Figure 6A:
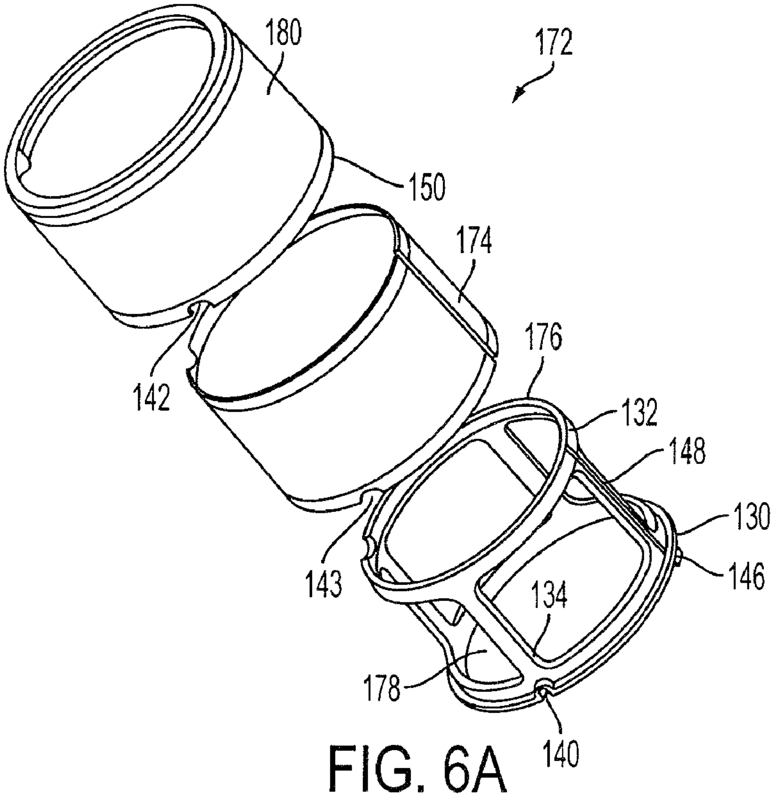
FIG. 6A shows an exploded assembly view of an alternate example hydrocarbon adsorbing arrangement.
Figure 6B:
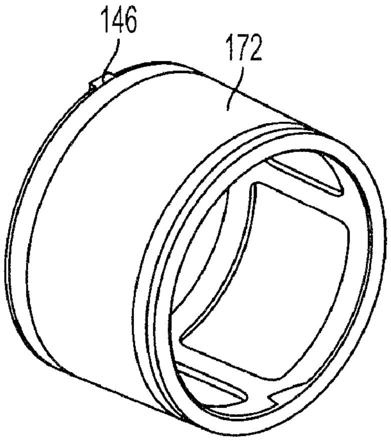
FIGS. 6B and 6C shows perspective views of the hydrocarbon adsorbing arrangement shown in FIG. 6A.
Figure 6C:
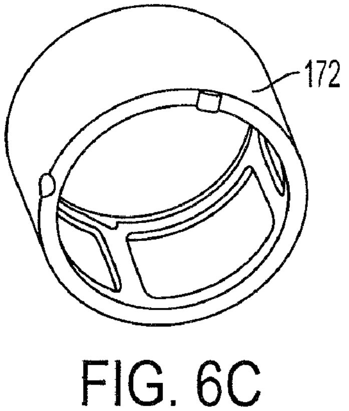

FIG. 6A is an exploded assembly view of the second hydrocarbon adsorbing arrangement 172 illustrated in dashed line in FIG. 2. FIGS. 6B and 6C are perspective views of the assembled second hydrocarbon adsorbing arrangement 172. The second hydrocarbon adsorbing arrangement 172 may include an inner cage 176 positionable within the rubber air intake tube 70, and may be configured to reduce deformation of the rubber air intake tube 70. The inner cage 176 may include a first ring 130 and a second ring 132 coupled with one or more ribs 134. The ribs 134 may provide openings 78 therebetween. A hydrocarbon adsorbing material 174 may disposed between the inner cage 176 and the rubber air intake tube 70 wherein a fluid containing hydrocarbons passing through the air intake tube can make contact with the carbon paper at least via the opening in the cage.

The second hydrocarbon adsorbing arrangement 172 may also include an outer shell 180. The inner cage 176 may be configured to fit within the outer shell 180 in a telescoping fashion. The hydrocarbon adsorbing carbon paper may be secured between the inner cage 176 and the outer shell 180. This may also be done in a telescoping fashion. In some embodiments all or a portion of the first hydrocarbon adsorbing arrangement 72 illustrated in FIG. 2 may be assembled in a telescoping fashion.

The inner cage 176 may include a first feature such as a notch 140, and the outer shell 180 may include a second feature such as a protrusion, or a bump 142 that may be configured to mate to provide a positive orientation of the inner cage 176 within the outer shell 180. The hydrocarbon adsorbent material 174 may also include a notch 143 that may insure positive orientation relative to the inner cage 176.

As shown in FIG. 2, the clean air tube 70 may include a retention lip 144 configured to retain the hydrocarbon adsorbing arrangement 172 within the air intake tube 70. The inner cage and the outer shell may be preassembled and positioned as an assembled unit in the clean air tube. The assembly may be pushed passed the retention lip 144 to install the hydrocarbon adsorbing arrangement 172 within the air intake tube 70 to be held in place by the a retention lip 144. Other retention methods may be used, such as using a snap fit, or an interference fit.

The inner cage 176 or the outer shell may include a third feature and the clean air tube may include a fourth feature that may be configured to mate with the third feature to provide a positive orientation of the outer shell within the clean air tube 70. For example the inner cage 176 may include a tab 146 that may be positionable within an opening in the retention lip 144.

The inner cage 76 may include a ridge 148 that may be configured to mate with a slot 150 on an inside of the outer shell 80. These features may aid in the assembly and function of the hydrocarbon adsorbing arrangement 172.

Figure 7:
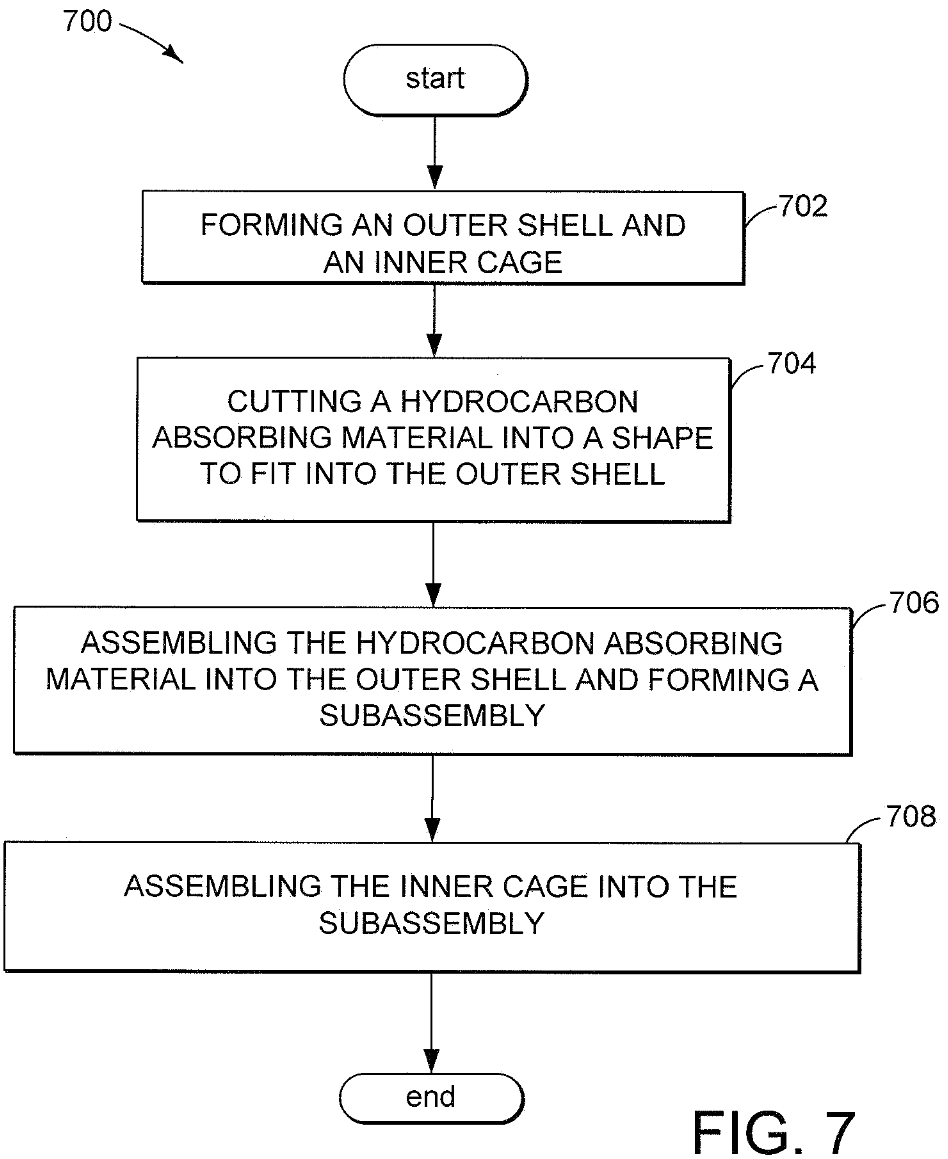
FIG. 7 shows a flow chart illustrating another example manufacturing method.
Figure 8:
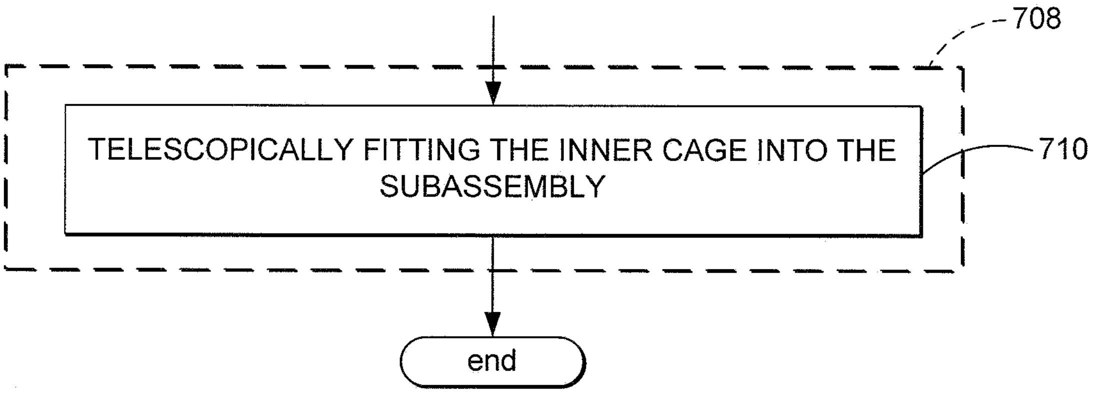
FIG. 8 shows a flow chart illustrating an alternative the example manufacturing method illustrated in FIG. 7.

FIG. 7 is a flow chart illustrating a method 700 that may be used for constructing the second hydrocarbon adsorbing arrangement 172 for an internal combustion engine in accordance with one embodiment. The method 700 may include, at 702, forming an outer shell and an inner cage. This may be done by, for example, a molding operation. The method 700 may also include, at 704, cutting a hydrocarbon adsorbing material into a shape to fit into the outer shell. The cutting may be done, for example, with a die cutting operation. The hydrocarbon absorbing material may be a carbon paper. The method 700 may also include, at 706, assembling the carbon paper into the outer shell and forming a subassembly. The assembling at 706 may include, curving the cut hydrocarbon adsorbing material into a cylindrical shape and fitting it into the outer shell. The method 700 may also include, at 708, assembling the inner cage into the outer shell/hydrocarbon absorbing material sub assembly. FIG. 8 is a flow chart illustrating an alternative to the assembling shown at 708, wherein at 710, the assembling may include telescopically fitting the inner cage into the subassembly. The fitting may be a press fit snap, weld, or stake.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A hydrocarbon adsorbing arrangement for an internal combustion engine comprising: an air intake tube having a cross-sectional shape and configured within the engine; an internal structural element positioned within the air intake tube configured to support the cross-sectional shape, the internal structural element including an outer shell and an inner cage which is separate from the outer shell, the inner cage extending along a length of the outer shell and traversing a full circumference of the air intake tube within the outer shell; and a hydrocarbon adsorber disposed adjacent the internal structural element wherein a fluid containing hydrocarbons passing through the air intake tube can make contact with the hydrocarbon adsorber; wherein the inner cage includes two rings which traverse the circumference of the air intake tube and a plurality of ribs coupled to the two rings, the ribs extending along the length of the outer shell between the two rings and adjacent to the hydrocarbon adsorber.

2. The arrangement of claim 1, wherein the internal structural element supports the air intake tube against deformation caused by vacuum generated within the air intake tube, without substantially restricting the fluid to the engine, where the fluid includes airflow.

3. The arrangement of claim 1 wherein the structural element includes windows to expose the hydrocarbon adsorber to the fluid.

4. The arrangement of claim 3 wherein the hydrocarbon adsorber includes carbon paper retained within the air tube via the inner cage of the internal structural element.

5. The arrangement of claim 1 wherein the structural element includes an anti-rotation shape.

6. The arrangement of claim 1 wherein the structural element is configured to be tamper evident.

7. The arrangement of claim 1 wherein the inner cage is configured to fit within the outer shell, and wherein the hydrocarbon adsorber is disposed between the inner cage and the outer shell, and wherein one or the other, or both, of the inner cage and the outer shell is configured to provide support for the air intake tube against deformation and/or collapse due to a pressure differential between an inside and an outside of the air intake tube.

8. The arrangement of claim 7 wherein the inner cage and the outer shell are preassembled and positioned as an assembled unit in the air intake tube.

9. The arrangement of claim 8 wherein the air intake tube is a clean air intake tube and includes a retention lip configured to retain the hydrocarbon adsorber within the clean air tube, and wherein the inner cage includes a first feature, the outer shell including a second feature configured to mate with the first feature to provide a positive orientation of the inner cage within the outer shell.

10. The arrangement of claim 9 wherein the outer shell includes a third feature and the clean air tube includes a fourth feature configured to mate with the third feature to provide a positive orientation of the outer shell within the clean air tube.

11. The hydrocarbon adsorbing arrangement of claim 1, wherein a first internal structural element and a second internal structural element are positioned within the air intake tube, and the first internal structural element is configured to fit in a curved region of the air intake tube and the second internal structural element is configured to fit in a straight region of the air intake tube.

12. A hydrocarbon adsorbing arrangement for an internal combustion engine comprising:

a deformable air intake tube configured within the engine to experience a vacuum generated by engine operation;

an outer shell positionable within the air intake tube;

an inner cage positioned within the outer shell and removably coupled to the outer shell, the inner cage having an opening, and the inner cage having two rings which traverse a full circumference of the air intake tube and a rib-cage structure coupled between the two rings and extending along a length of the outer shell, each of the inner cage and outer shell configured to reduce deformation of the air intake tube, and hydrocarbon adsorbing carbon paper disposed adjacent to the rib-cage structure of the inner cage between the inner cage and the outer shell, wherein air containing hydrocarbons passing through the air intake tube can make contact with the carbon paper at least via the opening in the inner cage.

13. The hydrocarbon adsorbing arrangement of claim 12, wherein the inner cage includes a plurality of openings to provide fluid communication with the carbon paper to adsorb and desorb hydrocarbons, and where the inner cage provides support against the vacuum to reduce deformation of the air intake tube.

14. The hydrocarbon adsorbing arrangement of claim 12, wherein the arrangement is tamper resistant and/or tamper evident in that the air intake tube is configured to deform or collapse upon operation of the internal combustion engine to an extent to affect the performance or operation of the internal combustion engine.

15. The hydrocarbon adsorbing arrangement of claim 12, wherein the air intake tube is under tension and formed substantially around edges of the inner cage to resist removal of the inner cage from within the air intake tube, and where the air intake tube includes one or more holes configured to align with a corresponding hole in the hydrocarbon adsorbing carbon paper.

16. The hydrocarbon adsorbing arrangement of claim 12, wherein the inner cage is configured to support the air intake tube from collapse and to hold the carbon paper against the outer shell via the two rings and the rib-cage structure.

* * * * *